United States Patent [19]

Leunissen

[11] Patent Number: 5,271,273
[45] Date of Patent: Dec. 21, 1993

[54] OIL LEVEL INDICATOR

[76] Inventor: Henry P. Leunissen, 703 W. 6th Ave., Mesa, Ariz. 85210

[21] Appl. No.: 826,449

[22] Filed: Jan. 27, 1992

[51] Int. Cl.⁵ .................... G01F 23/00; G01L 7/00
[52] U.S. Cl. ........................... 73/298; 73/302; 116/227
[58] Field of Search ............... 73/298, 302; 116/227; 33/267, 722

[56] References Cited

U.S. PATENT DOCUMENTS

| | | | |
|---|---|---|---|
| 494,467 | 3/1893 | Donathen | 73/298 X |
| 1,442,826 | 1/1923 | Renstrom | 116/227 X |
| 1,633,608 | 6/1927 | Sartakoff | 116/227 |
| 2,043,877 | 6/1936 | Ashworth | 73/298 X |
| 2,664,645 | 1/1954 | Qualman | 73/298 X |
| 4,213,338 | 7/1980 | Hardy | 116/227 X |
| 4,773,161 | 9/1988 | Grenier | 33/367 |
| 4,991,434 | 2/1991 | Snow | 33/722 X |

Primary Examiner—Daniel M. Yasich
Attorney, Agent, or Firm—Don J. Flickinger; Jordan M. Meschkow; Robert A. Parsons

[57] ABSTRACT

An oil level indicator having an oil container and an indicator tube extending therefrom. The indicator tube is inserted through a dip stick tube of an engine into the oil pan.

11 Claims, 2 Drawing Sheets

OIL LEVEL INDICATOR

BACKGROUND OF THE INVENTION

1. Field of the Invention

This invention relates to a device for use with motor vehicles.

More particularly, the present invention relates to a device for monitoring the level of oil in a motor vehicle.

2. The prior Art

Indicators and gauges have long been used in motor vehicles to monitor the operation of the vehicle. These indicators make monitoring the vital fluids of a car easier and require less hands on investigation. Gasoline levels can be determined by observing the gasoline gauge normally located in the dashboard of an automobile. Coolant levels can generally be determined by the level of coolant visible in an overflow container, although this is not always possible since some automobiles do not have the container.

Oil, however cannot be monitored without hands on investigation. Generally the only way to determine the level of oil in the crank case of an engine is to withdraw a dip stick from the engine. The dip stick generally extends down diagonally through the engine block into the oil pan. To determine the oil level, a person must withdraw the dip stick, wipe it clean, then insert it back into the engine. It is then withdrawn again, covered by oil to a series of marks. If the oil is to low, the dip stick will be covered to the fill mark or lower. While this method is very simple and straight forward, it can be time consuming and messy. In the past, these problems were not a consideration because gas stations were full service. When getting a fill-up, an attendant would also check the oil and various other fluid levels. Since the oil level does not have to be constantly monitored, these frequent checks were plenty.

However, at the present day, full service gas stations are few and most people use self service stations. At self service stations the customers must check the oil level themselves. If a person is dressed up for the evening or for going to work, the last thing he would want to do would be to come into contact with motor oil. The dip stick method also requires some sort of cloth or rag to clean off the dip stick. A rag is not always readily available. These problems cause a great many people to neglect checking the oil level in their automobile. This may cause engine damage or excessive engine wear because of low oil levels.

It would be highly advantageous, therefore, to remedy the foregoing and other deficiencies inherent in the prior art.

Accordingly it is an object of the present invention to provide a new oil level indicator.

Another object of the present invention is to provide an oil level indicator which is inexpensive and easy to install.

And another object of the present invention is to provide an oil level indicator which will indicate when more oil is required without being exposed to the motor oil.

Still another object of the present invention is to provide an oil level indicator which can be installed in all cars which use a dip stick.

SUMMARY OF THE INVENTION

Briefly, to achieve the desired objects of the instant invention in accordance with a preferred embodiment thereof, provided is an oil container having a cover through which a tube extends. The tube extends from the oil container and is inserted through the dip stick opening of an engine and extends down to a level in the oil pan between where the oil level is low and where more oil would need to be added. The indicator is run by engine heat. When the engine is hot a positive pressure is created in the oil container, forcing the oil out. When the engine cools down, a negative pressure is created in the oil container drawing oil into the container unless the oil level is low.

BRIEF DESCRIPTION OF THE DRAWINGS

The foregoing and further and more specific objects and advantages of the present invention will become readily apparent to those skilled in the art from the following detailed description of a preferred embodiment thereof taken in conjunction with the drawings, in which.

DETAILED DESCRIPTION OF THE PREFERRED EMBODIMENT

Figure 1:
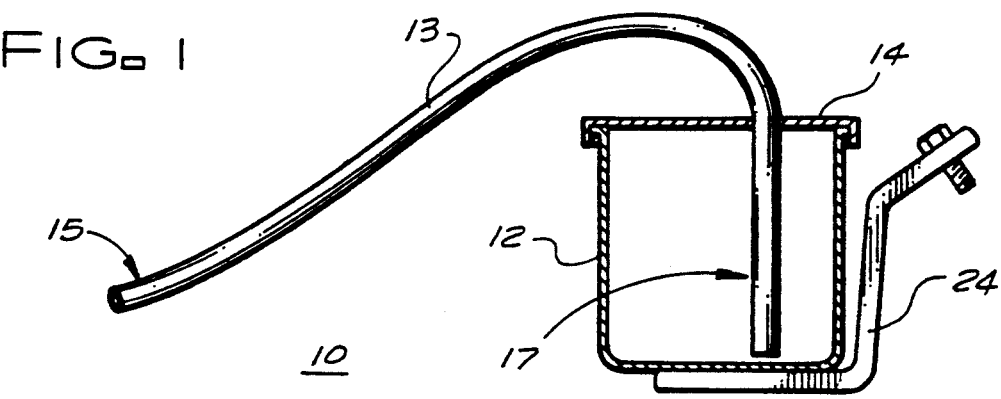
FIG. 1 is a cross-sectional side view of an oil level indicator.

Turning now to the drawings in which like reference characters indicate corresponding elements throughout the several views, attention is first directed to FIG. 1 which illustrates an oil level indicator generally designated 10, having an oil container 12 and an indicator tube 13. Oil container 12 is a sealable container which may be any size, but should be small enough to fit inconspicuously in the engine compartment of an automobile While still being capable of holding several ounces of oil. Oil container 12, in this embodiment, has a cover 14 Which sealably attaches to oil container 12 and a coupling 24 which attaches oil container 12 to the engine compartment. Indicator tube 13 is a piece of tubing through which oil flows to and from oil container 12. Indicator tube 13 has a dip stick end 15 and a container end 17. Container end 17 is inserted through cover 14 and extends to the bottom of oil container 12. Indicator tube 13 sealingly engages oil container 12 by a snug fit with cover 14. Those skilled in the art will understand that there are many ways container end 17 can sealingly engage cover 14, such as discussed below and shown in FIG. 5. Indicator tube 13 is used to indicate whether or not more oil needs to be added to the engine, therefore, it must be transparent. In this embodiment, indicator tube 13 is made of Teflon®, which is flexible, can withstand the heat generated by the engine and is transparent. Those skilled in the art will realize that other transparent materials, or opaque material having window inserts may be used.

Figure 2:
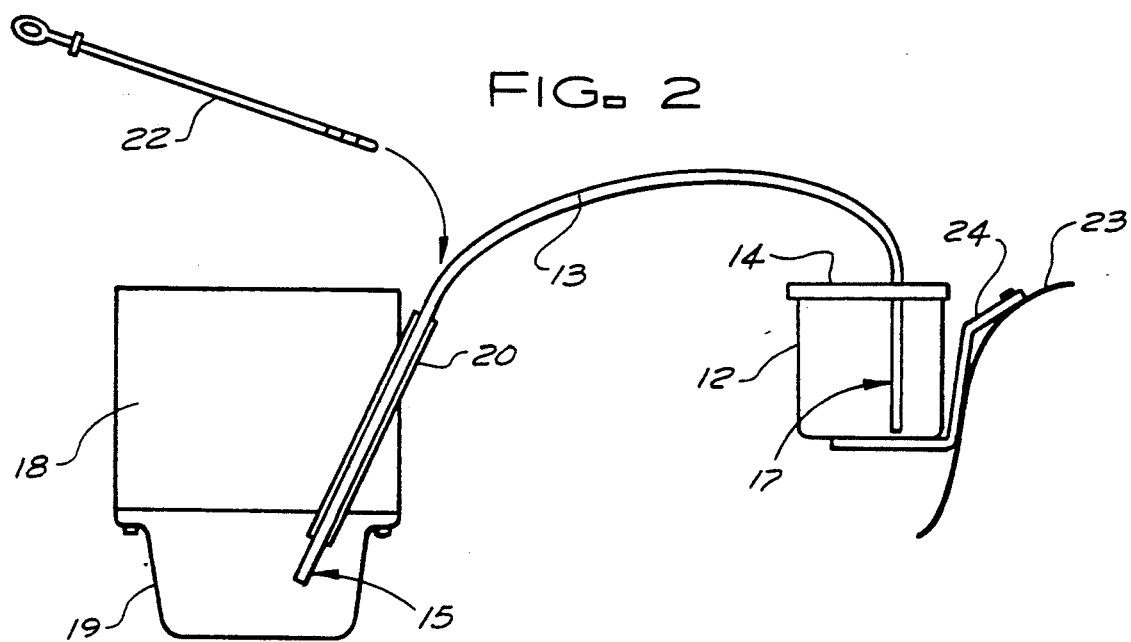
FIG. 2 is a cross-sectional side view of an oil level indicator, constructed in accordance with the teachings of the present invention, as it would appear installed on an automobile.

Referring to FIG. 2, oil level indicator 10 is illustrated installed on an automobile. An engine block 18 is shown with an oil pan 19 attached to its bottom. A dip stick tube 20, which is found in most automobiles, extends diagonally down through engine block 18 into oil pan 19. Generally a dip stick 22 is inserted in dip stick tube 20 and can be withdrawn to determine the oil level in oil pan 19. In the preferred embodiment of the present invention, dip stick end 15 of indicator tube 13 replaces dip stick 22 and is inserted into dip stick tube 20. Indicator tube 13 is of a diameter which allows it to be inserted in dip stick tube 20 with a snug fit. The snug fit allows friction to be used to secure dip stick end 15 in place. Dip stick end 15 is inserted through dip stick tube 20 into oil pan 19 to a depth between a low oil level and an add oil level. These levels can be determined by matching the length of indicator tube 13 inserted in dip stick tube 20 to the conventional indicator marks found on dip stick 22.

Still referring to FIG. 2, oil container 12 is attached near dip stick tube 20, preferably to a wheel well 23 and at a level higher than oil pan 19. Oil container 12 is attached to wheel well 23 by coupling 24 Coupling 24 is any conventional coupling device such as a bracket, which is coupled to wheel well 23 and to oil container 12. Indicator tube 13 then extends from oil container 12 into dip stick tube 20. The portion of indicator tube 13 between oil container 12 and dip stick tube 20 is the portion inspected when determining the oil level. This is the portion of indicator tube 13 which must be transparent or have a window. While the preferred embodiment of the present invention has indicator tube 13 extending directly from oil container 12 on wheel well 23 directly to dip stick tube 20, another embodiment could have indicator tube 13 routed through the passenger compartment of the automobile. Indicator tube 13 routed briefly through the dash board before returning to dip stick tube 20, would provide an indicator inside the passenger compartment.

Figure 3:
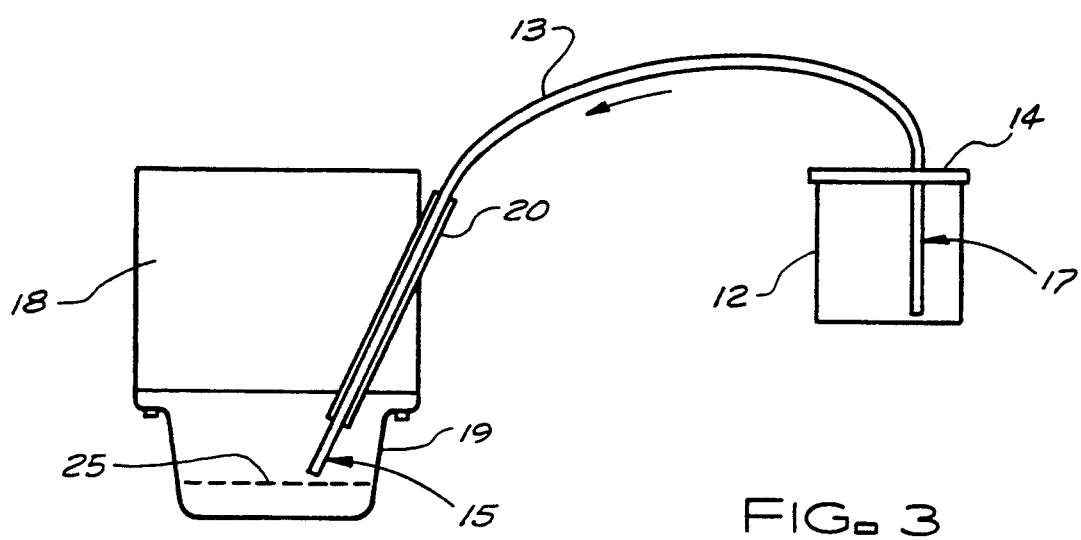
FIG. 3 is a cross sectional side view of the present invention installed on an engine when the engine is hot.

Referring now to FIG. 3, when the engine is hot and running, oil in oil pan 19 is lowered. This is because oil is being moved through the engine. The heat generated by the engine causes a slight positive pressure inside oil container 12 as it is warmed. These factors cause the oil in oil container 12 to move through indicator tube 13 into oil pan 19. As shown by broken line 25, the oil level in the engine is below the level of dip stick end 15 of indicator tube 13, draining the oil from it. At this time indicator tube 13 is empty.

Figure 4:
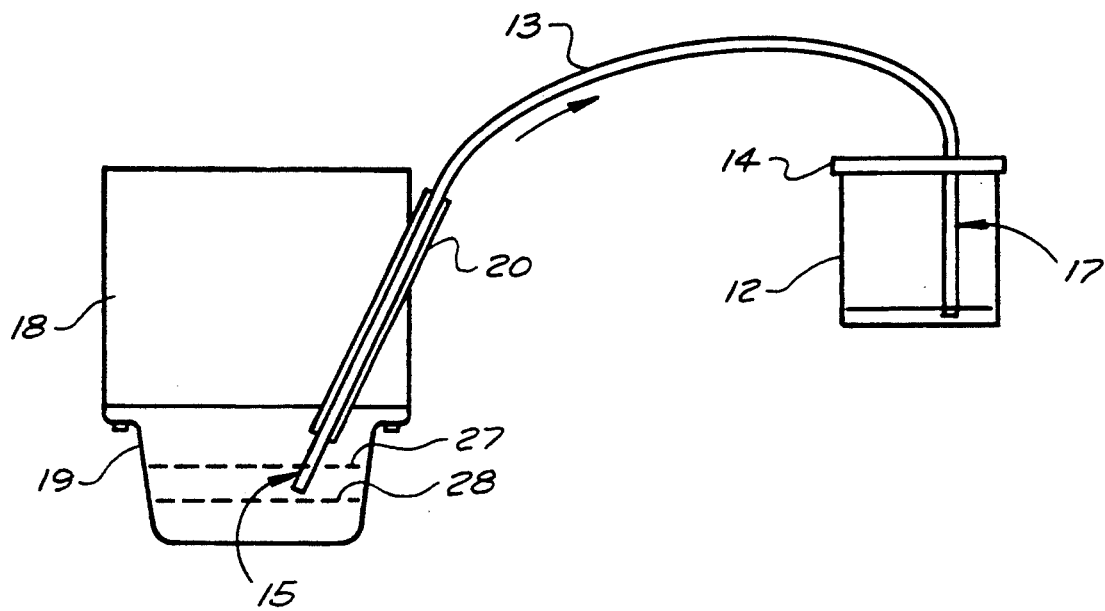
FIG. 4 is a cross sectional side view of the present invention installed on an engine when the engine is cold.

Referring now to FIG. 4, oil level indicator 10 is shown installed on an engine that has cooled. This is the time the oil level should be checked. When the engine is not running and is cool, oil from the engine drains back into oil pan 19. Also, a negative pressure is developed in oil container 12. Broken line 27 illustrates the oil level in oil pan 19 when there is sufficient oil. It can be seen that this is above the level of dip stick end 15 of indicator tube 13, since it is located slightly above the refill level. As the oil level rises to and above the level of dip stick end 15 in oil pan 19, the negative pressure in oil container 12 causes oil to be taken up into indicator tube 13. The negative pressure generated in oil container 12 is not very great, but it is sufficient to draw several ounces of oil into indicator tube 13 with some small amount deposited in oil container 12. A person checking the oil level need only observe indicator tube 13. If there is oil visible, then no oil needs to be added. If, however, the oil in oil pan 19 only reaches the refill level, shown by broken line 28, no oil will be drawn up into indicator tube 13. When indicator tube 13 has no oil visible in it, more oil needs to be added.

Figure 5:
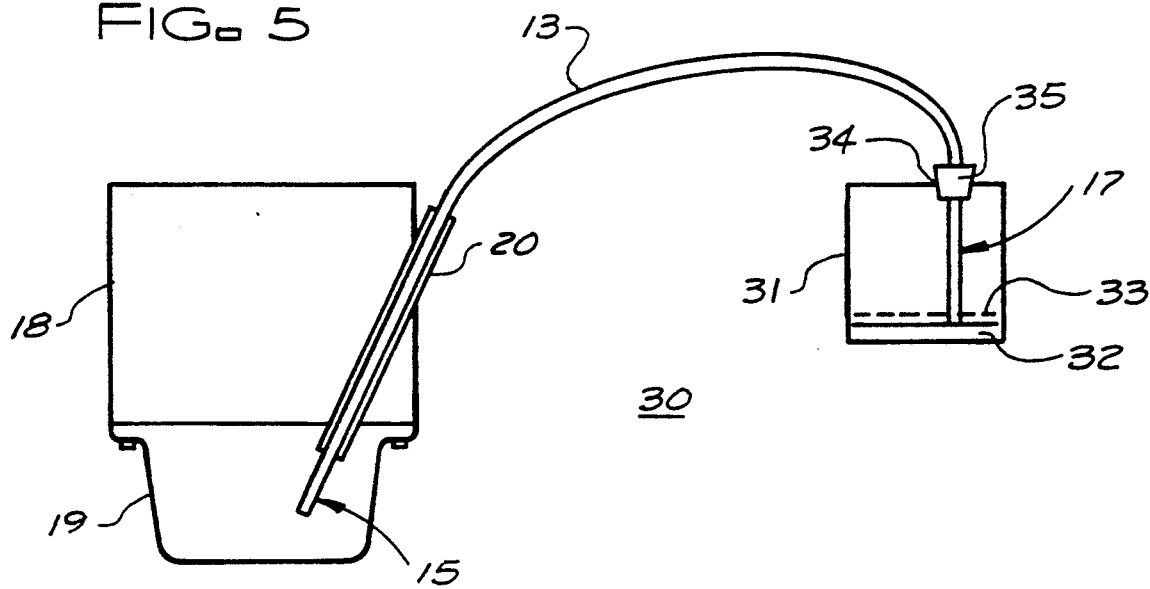
FIG. 5 is a cross-sectional side view of a second embodiment of an oil level indicator.

Referring now to FIG. 5, a second embodiment generally designated 30 is illustrated. This embodiment may be identical to the embodiment illustrated in FIG. 10, with the addition of an oil additive 32 to oil container 12. However, in second embodiment 30, an oil container 31, a single unit without a cover 14 and having an opening 34 formed in its top surface, is used. A plug 35 is inserted into opening 34 to sealably close oil container 31. Container end 17 of indicator tube 13 is inserted through plug 35 and is held securely and sealingly by friction. Oil container 31 is filled with additive 32 through opening 34, to a desired level. This level would be slightly below the level of container end 17 of indicator tube 13. As discussed above, when there is sufficient oil in oil pan 19, oil will enter indicator tube 13, with some small amount deposited in oil container 31. The oil which is deposited in oil container 31 mixes with additive 32 and brings the level up above container end 17 as shown by broken line 33. When the engine is started and warms up, the fluid in oil container 31, above container end 17, will be drawn into indicator tube 13 and deposited into oil pan 19. This is a very small amount of fluid, which contains oil mixed with some of oil additive 32. This adds a small amount of additive 32 to the oil every time the engine is started. Those skilled in the art will understand that an additive may be used with embodiment 10 as well as embodiment 30 if oil container 12 is of sufficient volume.

Various changes and modifications to the embodiments herein chosen for purposes of illustration will readily occur to those skilled in the art. To the extent that such modifications and variations do not depart from the spirit of the invention, they are intended t be included within the scope thereof which is assessed only by a fair interpretation of the following claims.

Having fully described the invention in such clear and concise terms as to enable those skilled in the art to understand and practice the same, the invention claimed is:

I claim:

1. An oil level indicator for use with an engine, said oil level indicator run by engine heat, and comprising:
   a sealable oil container having a sealable cover, said oil container generates a positive pressure when heated and a negative pressure when cooled;
   a coupling attached to said oil container for coupling said oil container proximate said engine; and
   an indicator tube sealably engaging said oil container and configured to extend into an oil pan of said engine.

2. An oil level indicator as claimed in claim 1 wherein said oil container is a single unit having an opening on its top surface, sealed by a plug through which said indicator tube extends.

3. A oil level indicator as claimed in claim 1 wherein said oil container contains an oil additive.

4. An oil level indicator for use in the engine compartment of an automobile and in combination with an engine having an engine block, an oil pan coupled to said engine block, and a dip stick tube extending through said engine block into said oil pan said oil level indicator comprising:
   a sealable oil container coupled to said engine compartment;
   an indicator tube having a container end sealably engaging said oil container and a dip stick end received by said dip stick tube and inserted into said oil pan to a predetermined level.

5. A oil level indicator as claimed in claim 4 wherein said container end of said indicator tube sealably and adjustably engages said container by friction.

6. An oil level indicator as claimed in claim 4 wherein said oil container has a sealable cover.

7. An oil level indicator as claimed in claim 4 wherein said oil container is a single unit having an opening on its top surface, sealed by a plug through which said indicator tube extends.

8. A oil level indicator as claimed in claim 4 wherein said oil container contains an oil additive.

9. A oil level indicator as claimed in claim 4 wherein said dip stick end of said indicator tube is secured in said dip stick tube by friction.

10. A method of use of an oil level indicator comprising the steps of:
   providing an engine compartment;
   providing an engine in said engine compartment having an engine block, an oil pan coupled thereto and a dip stick tube extending through said engine block into said oil pan;
   coupling a sealable oil container to said engine compartment;
   inserting an end of an indicator tube through said dip stick tube into said oil pan to a predetermined level;
   sealably inserting an opposite end of said indicator tube into said oil container.

11. A method as claimed in claim 10 further comprising the steps of:
   running said engine heat generated, thereby creating a positive pressure in said oil container;
   turning said engine off and letting it cool, thereby creating a negative pressure in said oil container; and
   observing said indicator tube to determine the oil level.

* * * * *